No. 791,217. PATENTED MAY 30, 1905.
E. C. SCHMERTZ, DEC'D.
R. LONGENECKER, ADMINISTRATOR.
PROCESS OF AND APPARATUS FOR MANUFACTURING WIRE GLASS.
APPLICATION FILED APR. 1, 1895.

WITNESSES:
Samuel S. Mehard
Henry W. Middlemist

INVENTOR
Edmund C. Schmertz
BY Wm. L. Pierce,
his ATTORNEY.

No. 791,217.

Patented May 30, 1905.

UNITED STATES PATENT OFFICE.

EDMUND C. SCHMERTZ, OF PITTSBURG, PENNSYLVANIA; RALPH LONGENECKER, ADMINISTRATOR OF SAID EDMUND C. SCHMERTZ, DECEASED, ASSIGNOR, BY MESNE ASSIGNMENTS, TO THE SCHMERTZ WIRE GLASS COMPANY, OF PITTSBURG, PENNSYLVANIA.

PROCESS OF AND APPARATUS FOR MANUFACTURING WIRE-GLASS.

SPECIFICATION forming part of Letters Patent No. 791,217, dated May 30, 1905.

Application filed April 1, 1895. Serial No. 543,946.

*To all whom it may concern:*

Be it known that I, EDMUND C. SCHMERTZ, a citizen of the United States, residing at Pittsburg, in the county of Allegheny and State of Pennsylvania, have invented or discovered a new and useful Process of and Apparatus for Manufacturing Wire-Glass, of which the following is a specification.

Figure 1:
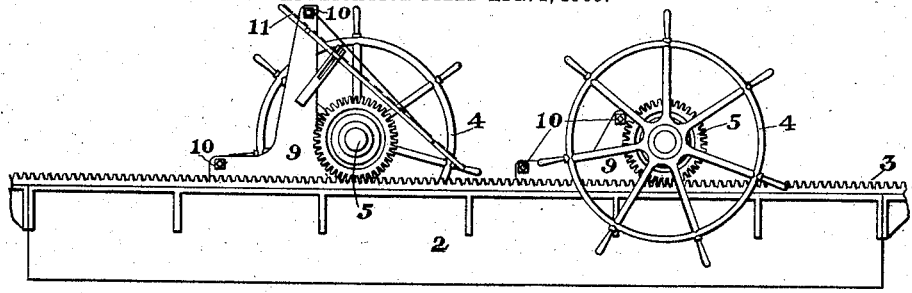
Figure 2:
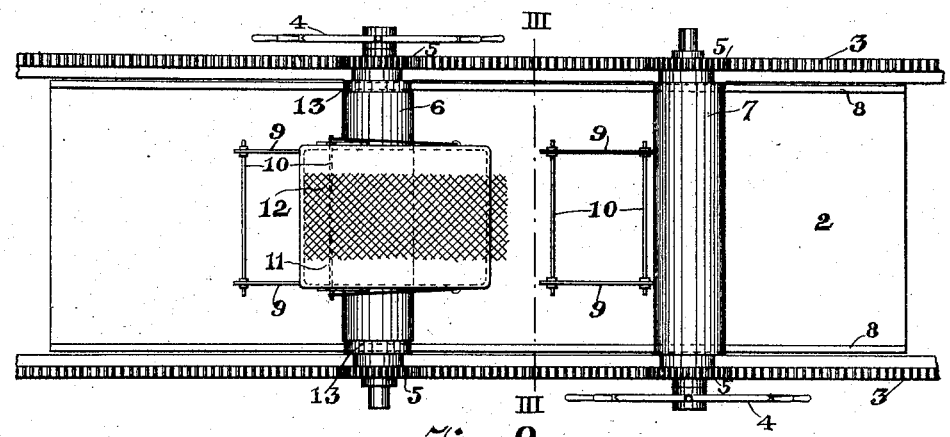
Figure 5:
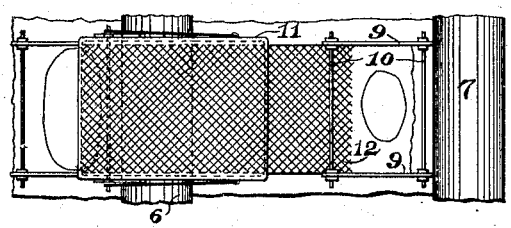
Figure 3:
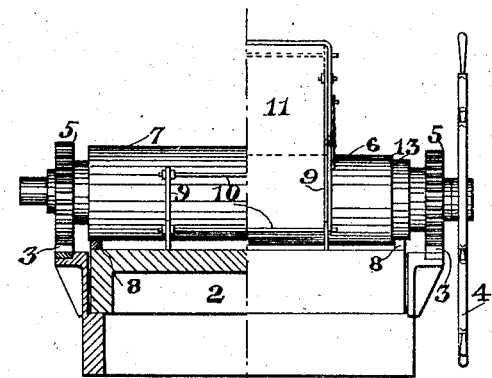
Figure 4:
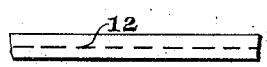

In the accompanying drawings, which make part of this specification, Figure 1 is a side elevation of the apparatus employed. Fig. 2 is a plan of the same. Fig. 3 is a combined elevation of the left-hand end and a section on line III III of Fig. 2. Fig. 4 is an edge view of the finished product. Fig. 5 is a broken plan showing the relative situation of the wire and the glass just before the second casting is rolled upon the first sheet; and Fig. 6, a side elevation of glass, wire, and lower end of wire-chute at same stage.

The purposes of my invention, generally stated, are to devise a certain combination of apparatus and such changes in the process of manufacturing wire-glass as will produce a glass with brilliant top surface instead of rough and dull; also, to prevent the glass becoming overchilled in making, so that it will not be excessively hard.

Wire-glass as it is now actually manufactured in this country is made in the following manner: The glass is poured upon the usual casting-bed and a roller pulled over the same, developing a sheet of glass of substantially the thickness of the final product. Back of this roller, which is sometimes termed the "smoothing-roller," wire-gauze is fed upon the top of the sheet thus formed from a chute or other suitable device. A second corrugated roller now passes over the wire-gauze and the sheet of glass and by its ribs deeply indents the wire-gauze in the body of the sheet. A third smooth finishing-roller now travels over the sheet thus corrugated and gives a finish to the top of the sheet. Some of the objections to this method are these. The action of the three rollers chills the top surface of the glass excessively before it can be transferred to the annealing-kiln. The result is that the glass becomes unduly hard and is difficult to cut. It is a serious task to cut wire-glass when made under the best conditions, and this extra hardening aggravates the situation; but another and more important objection to the method just described lies in the rough top surface produced. The first or leading roll gives a smooth finish to the top of the glass; but this is immediately ruined by the passage of the corrugated roll in the operation of forcing the wire down into the body of the sheet. This smooth finish is never regained, for although the third roller will efficiently smooth down any elevations on the surface of the glass it will not perfectly transfer the surplus glass to the depressions and fill them up with a perfect weld. An examination therefore of glass made by this process will disclose fine channels running across the surface which has been uppermost in the process. These channels roughen the surface, making it appear dull and lusterless, and greatly impair its appearance. The unevenness of the surface again adds to the trouble in cutting the article, as the diamond will not traverse it with the same ease as a polished surface. I proceed upon a radically different theory of forming the product and secure a sheet with brilliant top surface and also one which is as readily cut as is possible with composite articles of this character.

In the accompanying drawings, which make part of this application, 2 is the ordinary casting-table, having the usual racks 3 3 on its longitudinal edges.

4 4 are the hand-wheels, which by pinions 5 5 advance the leading roll 6, which may be either smooth or corrugated, and secondary roll 7. These rolls rest upon trangs 8 8, and preferably one-fourth inch in height, and which determine the thickness of the glass, subject to a special provision in the leading roll hereinafter described.

9 9 are the guides which fix the width of the sheet and are pushed ahead by the rolls.

10 10 are the rods connecting the right and left hand guides.

The mechanism thus far described is old and well known.

11 is a chute for wire 12, located at the rear of the first roll.

The leading roll 6 has its ends 13 13 recessed, preferably one-eighth of an inch, so that the body of the roll is left one-eighth of an inch above the bed of the table, while the body of the second roll is one-fourth of an inch above the bed. Obviously these proportional elevations can be obtained in many other ways besides recessing the rolls, and I do not intend to be limited to this precise construction except where specifically claimed. The object I have in view is to make the first sheet about one-half the thickness of the resulting product.

The operation of the device is as follows: A ladleful or suitable amount of glass is poured upon the table in advance of the leading roll and the leading roll moved forward. In practice the leading end of the sheet thus formed is discarded as made of chilled glass. Therefore I do not commence to feed the wire down the chute until the first roll has made a sheet of glass sufficiently long to project about eighteen inches back of the wire-chute. At this stage the wire is fed down upon the top of the sheet and finally lies flat upon the same, as shown in Fig. 5. As the forward or dead end of the sheet of glass moves near the rear roll I make a second casting upon said dead end, that the imperfect ends of the two sheets may coincide, and thus economize material. The rear roll advancing crushes down this second casting and forces the same over and through the wire-gauze, firmly welding the material in the second casting to the wire-gauze and to the first sheet and firmly uniting the three component parts. A brilliantly-polished top surface is imparted to the product by the passage of the second roll, and the wire is left substantially in the center of the finished sheet, whose thickness will be the height of the rear roller above the bed of the table. The top sheet having only one roller traversing it will not become so chilled as where two or more rolls pass over it, and especially where one is a corrugated roll throwing the glass up in ridges.

My invention is distinguished from the art as practiced in this country not only by the superior quality of the product, but as well by the following features, either singly or in combination, viz: by the use of two rolls instead of three or more, by the formation of an original sheet a fraction of the desired thickness, feeding the wire upon the top surface of said sheet, and subsequent welding to both wire and original sheet of a top sheet with unbroken surface formed from a second casting while the first sheet is being completed.

The mechanism for propelling the rollers, introducing the wire, means for determining the thicknesses of the sheets of glass, the thickness of the sheets and their width, as well as other details, may be modified while retaining the salient features of my invention. If the leading roll is corrugated, the second roll need not necessarily be in a higher plane above the table than the first roll.

I claim—

1. In the manufacture of wire-glass, the combination of a table; a leading roll; a second finishing-roll and means for introducing the wire by gravity between said leading and finishing rolls.

2. In the manufacture of wire-glass; the combination of a table; a leading roll with recessed ends; a finishing-roll whose body is higher from the bed of the table than the body of the leading roll and means for introducing the wire by gravity between said leading and finishing rolls.

3. An improvement in the process of manufacturing wire-glass which consists in rolling a sheet of glass of less thickness than the ultimate product required; simultaneously feeding by gravity wire upon the top of said sheet at the rear of the leading roll and rolling a second sheet of glass upon said original sheet and the wire, simultaneously embedding the wire and finishing the sheet.

4. An improvement in the process of manufacturing wire-glass which consists in rolling a sheet of glass of about half the ultimate thickness required; simultaneously feeding by gravity wire upon the top of said sheet at the rear of the leading roll and rolling a second sheet of glass upon said original sheet and the wire, simultaneously embedding the wire and finishing the sheet.

In testimony whereof I have hereunto set my hand this 22d day of March, A. D. 1895.

EDMUND C. SCHMERTZ.

Witnesses:
   WM. L. PIERCE,
   WM. A. WAY.